(12) United States Patent
Beack et al.

(10) Patent No.: US 11,508,385 B2
(45) Date of Patent: Nov. 22, 2022

(54) METHOD OF PROCESSING RESIDUAL SIGNAL FOR AUDIO CODING, AND AUDIO PROCESSING APPARATUS

(71) Applicant: Electronics and Telecommunications Research Institute, Daejeon (KR)

(72) Inventors: Seung Kwon Beack, Daejeon (KR); Jongmo Sung, Daejeon (KR); Mi Suk Lee, Daejeon (KR); Tae Jin Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 397 days.

(21) Appl. No.: 16/686,859

(22) Filed: Nov. 18, 2019

(65) Prior Publication Data

US 2021/0005208 A1 Jan. 7, 2021

(30) Foreign Application Priority Data

Jul. 2, 2019 (KR) .......................... 10-2019-0079361

(51) Int. Cl.
| | | |
|---|---|---|
| *G06N 3/04* | (2006.01) | |
| *G06N 3/08* | (2006.01) | |
| *G10L 19/032* | (2013.01) | |
| *G10L 19/02* | (2013.01) | |

(52) U.S. Cl.
CPC ............ *G10L 19/0204* (2013.01); *G06N 3/04* (2013.01); *G06N 3/08* (2013.01); *G10L 19/032* (2013.01)

(58) Field of Classification Search
CPC ... G10L 19/0204; G10L 19/032; G10L 25/30; G10L 19/08; G10L 19/0017; G10L 19/02; G10L 19/26; G06N 3/04; G06N 3/08; G06N 3/0454; G06N 3/088
See application file for complete search history.

(56) References Cited

U.S. PATENT DOCUMENTS

| | | | |
|---|---|---|---|
| 5,737,716 A * | 4/1998 | Bergstrom | G10L 19/02 |
| | | | 704/E19.01 |
| 10,381,020 B2 * | 8/2019 | Ramprashad | G10L 25/30 |
| 10,586,531 B2 * | 3/2020 | van den Oord | G06N 3/08 |
| 2002/0069052 A1 * | 6/2002 | Chen | G10L 19/04 |
| | | | 704/E19.023 |

(Continued)

FOREIGN PATENT DOCUMENTS

WO WO-2019081070 A1 * 5/2019 ............. G06N 20/10

OTHER PUBLICATIONS

Janusz Klejsa and Per Hedelin and Cong Zhou and Roy Fejgin and Lars Villemoes, "High-quality speech coding with SampleRNN," arXiv:1811.03021v1 [eess.AS], 2018 (Year: 2018).*

(Continued)

*Primary Examiner* — Bhavesh M Mehta
*Assistant Examiner* — Nandini Subramani
(74) *Attorney, Agent, or Firm* — NSIP Law (57) ABSTRACT

Disclosed is a method of processing a residual signal for audio coding and an audio coding apparatus. The method learns a feature map of a reference signal through a residual signal learning engine including a convolutional layer and a neural network and performs learning based on a result obtained by mapping a node of an output layer of the neural network and a quantization level of index of the residual signal.

13 Claims, 7 Drawing Sheets

(56) References Cited

U.S. PATENT DOCUMENTS

| | | | |
|---|---|---|---|
| 2005/0246164 A1* | 11/2005 | Ojala | G10L 19/24 |
| | | | 704/E19.044 |
| 2006/0277040 A1 | 12/2006 | Sung et al. | |
| 2009/0192792 A1 | 7/2009 | Lee et al. | |
| 2010/0174534 A1* | 7/2010 | Vos | G10L 19/09 |
| | | | 704/207 |
| 2011/0057818 A1 | 3/2011 | Jung et al. | |
| 2011/0119054 A1 | 5/2011 | Lee et al. | |
| 2015/0332702 A1* | 11/2015 | Disch | G10L 19/24 |
| | | | 704/500 |
| 2017/0337929 A1 | 11/2017 | Beack et al. | |
| 2019/0189137 A1* | 6/2019 | Disch | G10L 21/0232 |

OTHER PUBLICATIONS

S. Kankanahalli, "End-to-end optimized speech coding with deep neural networks," arXiv preprint arXiv:1710.09064, 2017 (Year: 2017).*

Neuendorf, M et al., "Unified Speech and Audio Coding Scheme for High Quality at Low Bitrates", *IEEE International Conference on Acoustics, Speech and Signal Processing,* Apr. 2009, pp. 1-5 (5 pages in English).

* cited by examiner

METHOD OF PROCESSING RESIDUAL SIGNAL FOR AUDIO CODING, AND AUDIO PROCESSING APPARATUS

CROSS-REFERENCE TO RELATED APPLICATION(S)

This application claims the priority benefit of Korean Patent Application No. 10-2019-0079361 filed on Jul. 2, 2019, in the Korean Intellectual Property Office, the disclosure of which is incorporated herein by reference for all purposes.

BACKGROUND

1. Field

One or more example embodiments relate to a method of processing a residual signal for audio coding and an audio processing apparatus and, more particularly, to technology for training a neural network to reduce an amount of information of a residual signal and applying the neural network to the audio coding.

2. Description of Related Art

In general, a method of using a residual signal in audio coding has been widely used. In the method, the residual signal may be a signal having a largest amount of information in an audio. As audio coding techniques are developed, it is necessary to reduce an amount of information of an audio transferred from an encoder to a decoder.

However, since the amount of information of the audio has not been reduced using a typical method, there is a desire for a method for reducing the amount of information.

SUMMARY

An aspect provides a method and apparatus for generating a more accurate residual signal in an audio decoding process by restoring a residual signal having a largest amount of information in an audio using a neural network to which a convolutional layer is applied.

Another aspect also provides a method and apparatus for outputting a residual signal by applying a reference signal to a neural network in an audio decoding process, generating an original signal by combining the reference signal and the residual signal, thereby directly generating the residual signal in the audio decoding process without encoding, which may improve an audio coding efficiency.

According to an aspect, there is provided a~~including:

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
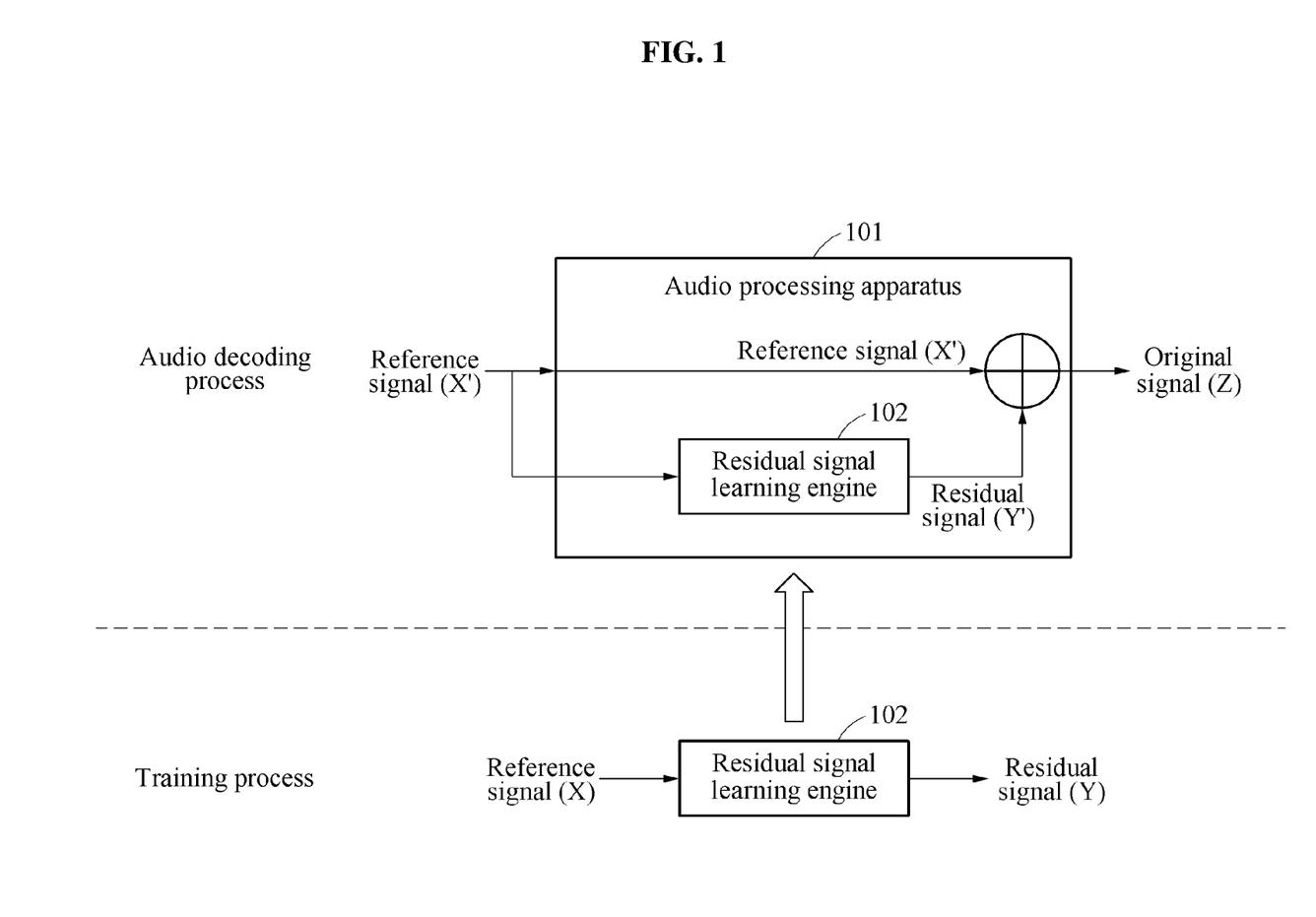
FIG. 1 is a diagram illustrating an audio processing apparatus for processing a residual signal using a neural network according to an example embodiment.

FIG. 1 is a diagram illustrating an audio processing apparatus for processing a residual signal using a neural network according to an example embodiment.

A residual signal may be a signal having a largest amount of information, and may represent a remainder excluding envelope information and pitch information in an original signal. According to an example embodiment, to reduce an amount of information of the residual signal, a processing method in a structure of a neural network is proposed. The residual signal may be restored by training the neural network in advance and using the trained neural network in an audio decoding process.

Referring to FIG. 1, a residual signal learning engine 102 may be used to restore a residual signal in a decoding process. The residual signal learning engine 102 may operate by a process of an audio processing apparatus 101.

In a training process, the residual signal learning engine 102 may output a residual signal Y using a reference signal X. Here, the reference signal X and the residual signal Y may be obtained from an original signal Z In the audio decoding process, the audio processing apparatus 101 may output a residual signal Y' from a reference signal X' using the residual signal learning engine 102 used in the training process. The audio processing apparatus 101 may generate the original signal Z by combining the reference signal X' and the residual signal Y'.

A process of generating the reference signal X and the residual signal Y for training a neural network will be described in detail with reference to FIGS. 2 and 3.

Figure 2:
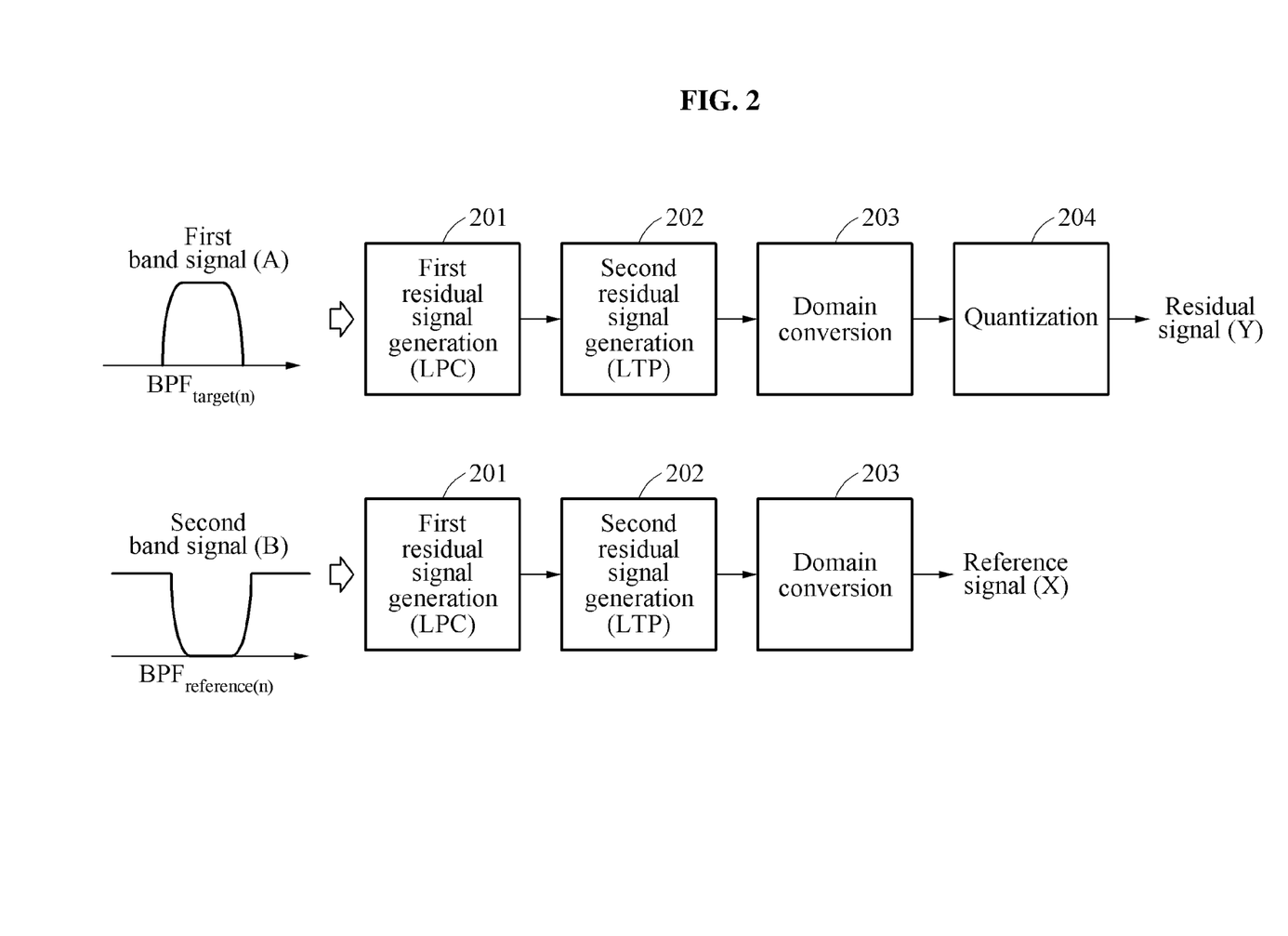
FIG. 2 is a diagram illustrating a process of generating an input signal for a neural network and a residual signal corresponding to a target signal according to an example embodiment.

FIG. 2 is a diagram illustrating a process of generating an input signal for a neural network and a residual signal corresponding to a target signal according to an example embodiment.

Referring to FIG. 2, a reference signal X may be an input of the residual signal learning engine 102 and a residual signal Y may be an output of the residual signal learning engine 102. The residual signal Y may be obtained from a first band signal A. In this instance, the first band signal A may be determined by applying a filter from an original signal indicating an entire band. Here, the filter may be BPF. Alternatingly, to output the residual signal Y of a high frequency band, the filter may also be HPF.

A second band signal B may be generated using a filter having an inverse relationship with the filter used for generating the first band signal A. In FIG. 2, through BPF having the inverse relationship with the BPF used in the first band signal, the second band signal B may be obtained. In this instance, a sum of the filter used for generating the first band signal A and the filter used for generating the second band signal B may be "1". That is, an all-pass filter may be obtained by combining the filter used for generating the first band signal A and the filter used for generating the second band signal B. The foregoing description may be represented by Equation 1 as shown below.

$$x(n) = BPF_{target}(n) * x(n) + BPF_{reference}(n) * x(n) \quad \text{[Equation 1]}$$

In Equation 1, $BPF_{target}$ denotes a filter used for generating the first band signal A in an original signal $x(n)$ of the entire band, and $BPF_{reference}$ denotes a filter used for generating the second band signal B in the original signal $x(n)$ of the entire band.

Referring to FIG. 2, to the first band signal A, a first residual signal generating process 201 and a second residual signal generating process 202 of may be applied. For example, the first residual signal generating process 201 may be a process of generating an LPC residual signal, and may be a process of removing an envelope. Also, the second residual signal generating process 202 may be a process of generating an LPT residual signal, and may be a process of removing a pitch which is a periodical component.

The first residual signal generating process 201 may be performed according to Equation 2 below.

$$x_{res\_lpc}(n) = x(n) - a_k * x(n), x_{res}(n) = x_{res\_lpc}(n) - T_p * x_{res\_lpc}(n) \quad \text{[Equation 2]}$$

In Equation 2, $x_{res\_lpc}(n)$ denotes a result obtained by removing an envelope from the first band signal A through the first residual signal generating process 201, and $x_{res}(n)$ denotes a result obtained by removing an envelope and a pitch from the first band signal A through the second residual signal generating process 202. Also, $a_k$ denotes an LPC coefficient and $T_p$ denotes a periodic coefficient.

After the envelope and the pitch are removed through the first residual signal generating process 201 and the second residual signal generating process 202, the first band signal A may be converted from a time domain to a frequency domain through a domain converting process 203. Here, a coefficient of the domain converting process 203 may be corrected so as to have an absolute value irrespective of a conversion method. Also, after the first residual signal generating process 201, the second residual signal generating process 202, and the domain converting process 203 are applied to the first band signal A, the residual signal Y may be output through a quantization process 204. Here, the residual signal Y may be a target signal which is an output of the residual signal learning engine 102.

Similarly, the first residual signal generating process 201, the second residual signal generating process 202, and the domain converting process 203 may be applied to the second band signal B. The quantization process 204 may not be applied to the second band signal B. The reference signal X may be output from the second band signal B through the first residual signal generating process 201, the second residual signal generating process 202, and the domain converting process 203. Here, a reference signal C may be an input signal which is an input of the residual signal learning engine 102.

Figure 3:
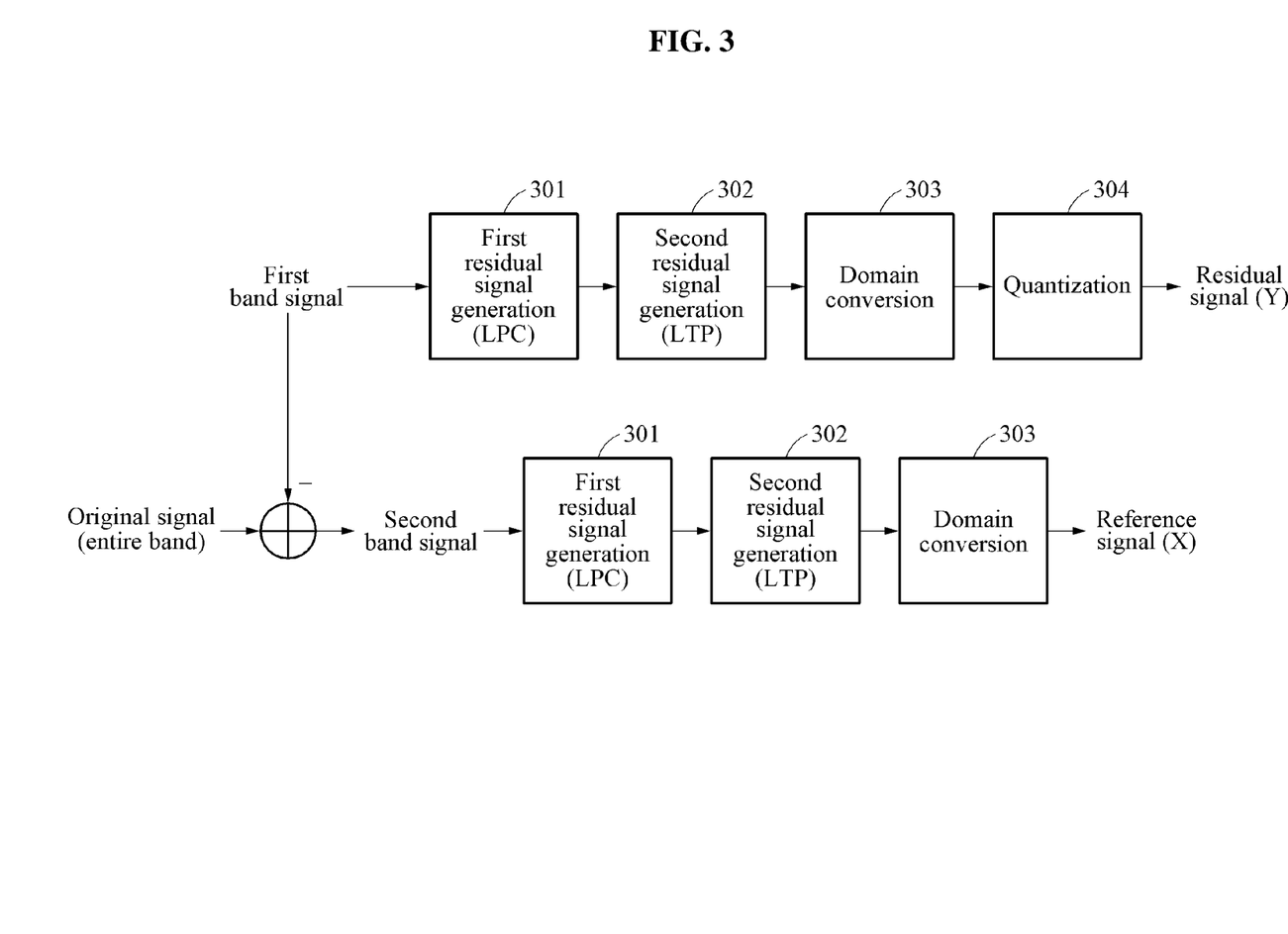
FIG. 3 is a diagram illustrating a relationship between an original signal and a reference signal according to an example embodiment.

FIG. 3 is a diagram illustrating a relationship between an original signal and a reference signal according to an example embodiment.

When an original signal corresponds to an entire band, a second band signal that remains excluding a first band signal from the original signal may be obtained. A residual signal Y may be obtained from the first band signal through a first residual signal generating process 301, a second residual signal generating process 302, a domain converting process 303, and a quantization process 304. Also, a reference signal X may be obtained from the second band signal through the first residual signal generating process 301, the second residual signal generating process 302, and the domain converting process 303. The reference signal X may be an input signal of the residual signal learning engine 102 and the residual signal Y may be a target signal of the residual signal learning engine 102.

The same description of FIG. 2 may also be applied to the first residual signal generating process 301, the second residual signal generating process 302, the domain converting process 303, and the quantization process 304.

Figure 4:
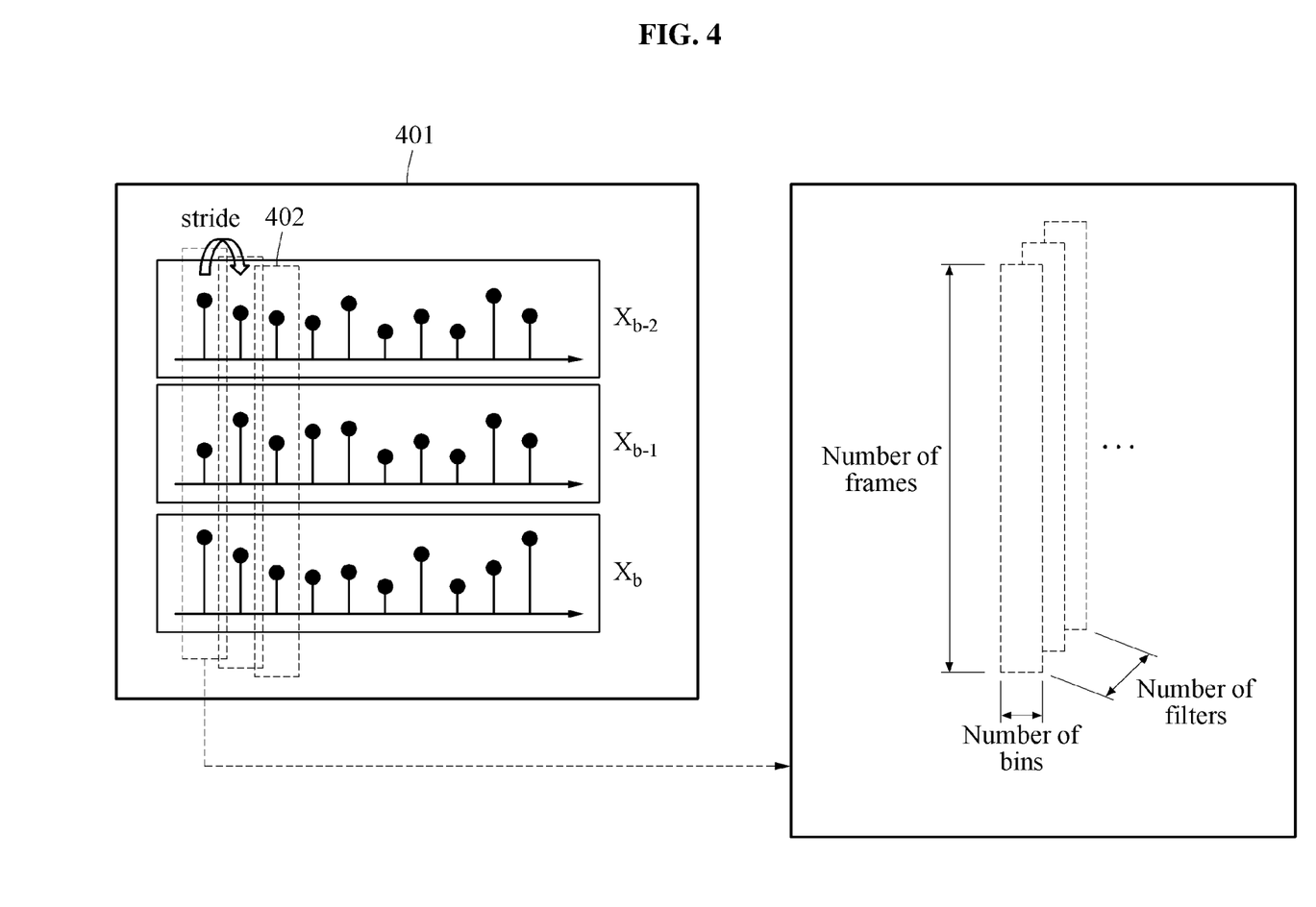
FIG. 4 is a diagram illustrating a feature map of an input signal according to an example embodiment.

FIG. 4 is a diagram illustrating a feature map of an input signal according to an example embodiment.

FIG. 4 illustrates a feature map 401 of a reference signal which is an input signal input to a neural network. Specifically, FIG. 4 illustrates a feature map in which absolute values of coefficients in a frequency domain obtained by frame-by-frame derivation of a reference signal, which is an input signal of a neural network, are grouped in units of frame and expressed in a two-dimensional form.

In FIG. 4, $X_b$ denotes a reference signal obtained for each frame.

$$X_b = TF\{[x_{res}((N-1) \cdot b), \ldots, x_{res}((N-1) \cdot b + N - 1)]^T\} = [X_b(0), \ldots, X_b(m-1)]^T \quad \text{[Equation 3]}$$

In Equation 3, b denotes an index of a frame and N denotes a size of the frame in a time domain. M may be determined based on a conversion scheme. For example, when the conversion scheme is DFT, M may be expressed as "M=N/2+1" and may be coefficient of absolute values obtained from a complex number. Also, when the conversion scheme is DCT, M may be a real number value expressed as "M=N/2".

In FIG. 4, a filter to be used for a neural network such as a convolutional neural network (CNN) may be defined based on a number of frames and a number of bins. A process of training the neural network may include a process of extracting a feature of a reference signal by filtering the feature map of FIG. 4 using a plurality of filters at stride intervals. A convolutional layer of the neural network may be used to extract the feature of the reference signal by applying the plurality of filters to the feature map of the reference signal as illustrated in FIG. 4.

Figure 5:
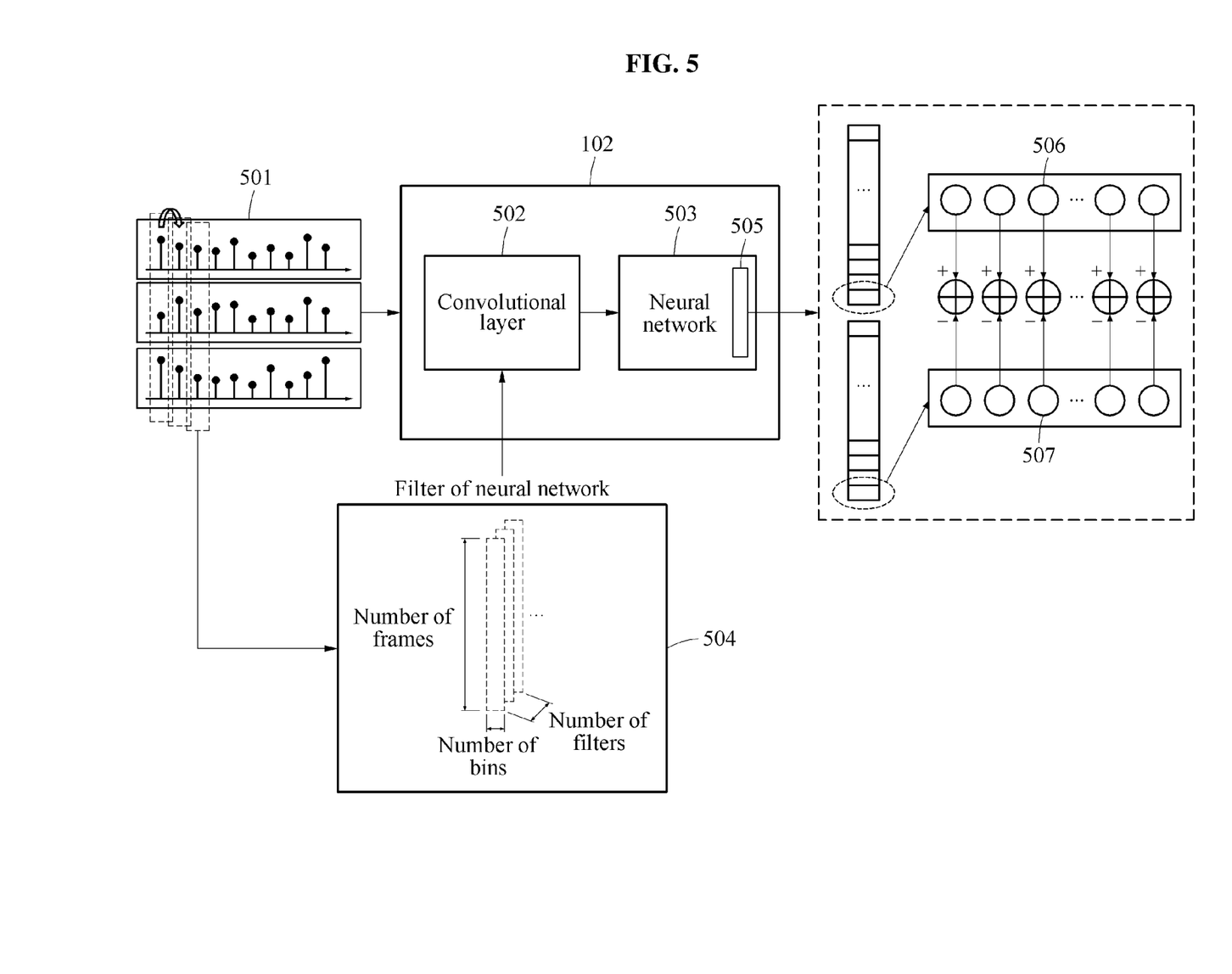
FIG. 5 is a diagram illustrating a mapping relationship between a neural network and a feature map of an input signal according to an example embodiment.

FIG. 5 is a diagram illustrating a mapping relationship between a neural network and a feature map of an input signal according to an example embodiment.

Referring to FIG. 5, the residual signal learning engine 102 may include a convolutional layer 502 and a neural network 503. In FIG. 5, the convolutional layer 502 may be a layer for extracting a feature from a feature map 501 of a reference signal by convoluting a plurality of filters 504 with the feature map 501. Also, the neural network 503 may be a network for classifying the reference signal based on the extracted feature.

A number of layers of the convolutional layer 502 may be the same as a number of the filters 504 of FIG. 5. Specifically, in FIG. 5, a number of nodes 506 of an output layer 505 included in the neural network 503 may be the same as an index 507 at a quantization level of a residual signal which is an object signal. For example, the output layer 505 of the neural network 503 may be in a softmax structure. That is, the number of nodes of the output layer of the neural network 503 may be the same as the quantization level of the residual signal which is the object signal.

For example, when, to the residual signal, a quantization that an absolute value of a predetermined frequency coefficient has 15 levels are applied, the number of nodes 506 of the output layer 505 of the neural network 503 may indicate a number to be mapped to the quantization level.

In a case of a decoding process, a quantization level of a reference signal predicted from the neural network 503 may be obtained. The residual signal learning engine 102 may derive a residual signal using the quantization level. When a number of frequencies to be predicted from a predetermined frame of the reference signal is K, an output value of the output layer 505 of the neural network 503 may be determined by multiplying K by the number (quantization level) of the nodes 506 of the output layer 505 of the neural network 503.

Figure 6:
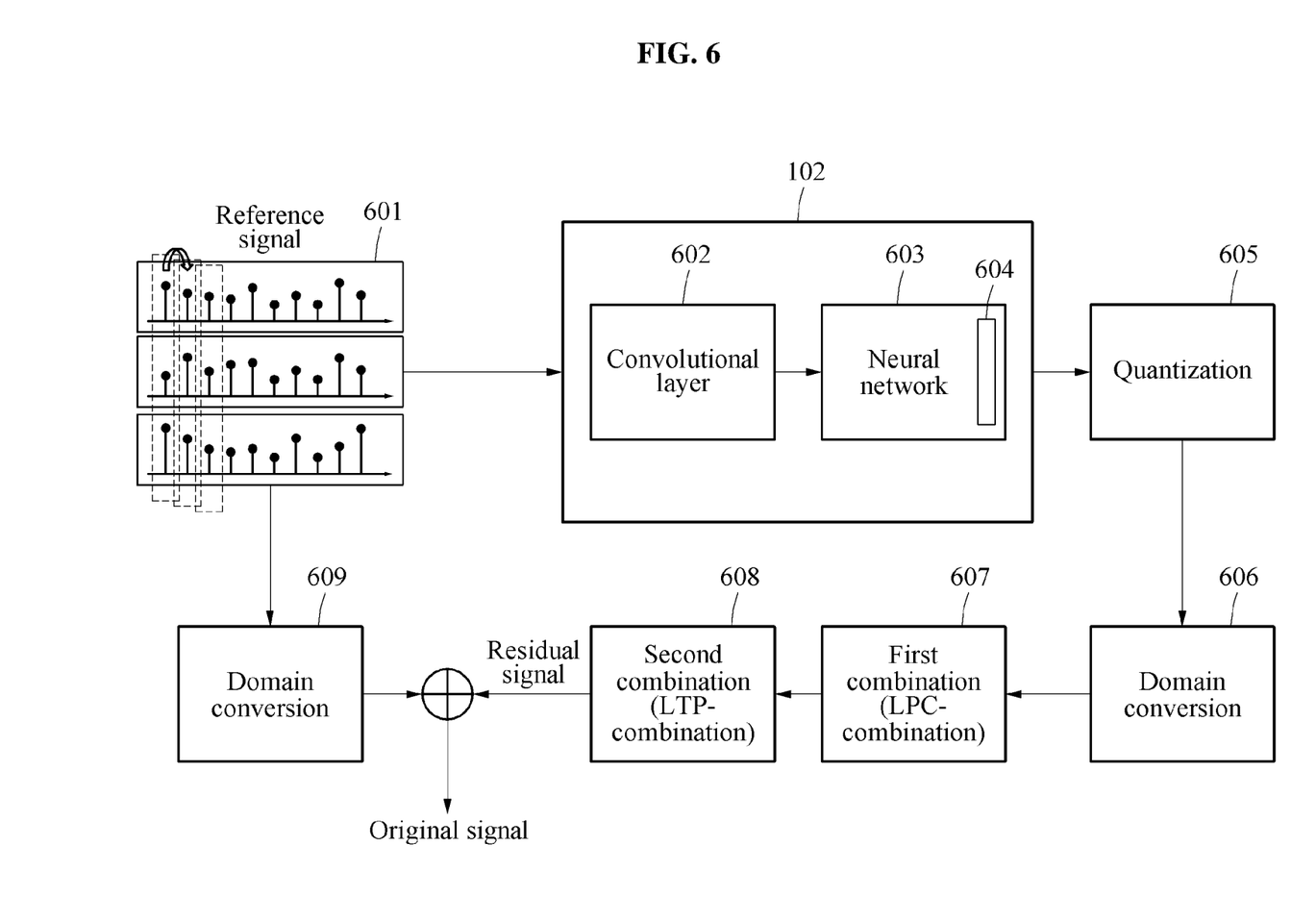
FIG. 6 is a diagram illustrating an audio processing method for performing a decoding process according to an example embodiment.

FIG. 6 is a diagram illustrating an audio processing method for performing a decoding process according to an example embodiment.

FIG. 6 illustrates an audio decoding process performed by the audio processing apparatus 101. Referring to FIG. 6, a reference signal 601 may be input to the residual signal learning engine 102. Here, the residual signal learning engine 102 may be a result of training performed through the processes described with reference to FIGS. 2 and 5.

The reference signal 601 may be a signal restored by the audio processing apparatus 101 through a decoding process. The reference signal 601 may be input to a convolutional layer 602 of the residual signal learning engine 102 so that a feature thereof is extracted. The extracted feature may be output through a neural network 603. In a softmax layer, which is an output layer 604 of the neural network 603, one-hot encoding may be performed so that one largest output value is derived from an output node. A quantization process 605 may be applied to the output value derived from the output layer 604. In this instance, a position index of a node of the output layer 604 may be used as an index in the quantization process 605.

Thereafter, a coefficient corresponding to K frequency domains may be restored as a predicted value through the quantization process 605. The restored coefficient may be converted from a frequency domain to a time domain through a domain conversion 606. The coefficient having been converted into the time domain may be LPC-combined through a first combining process 607. Also, through a second combining process 608, the coefficient having been converted into the time domain may be LTP-combined so that a residual signal is output. The reference signal 601 may be converted from the frequency domain to the time domain through a domain converting process 609. The reference signal 601 having been converted into the time domain may be combined with the residual signal, so that an original signal of the entire band is output. In this example, filtering of a first band may be applied to the reference signal and filtering of a second band that remains excluding the first band from the entire band may be applied to the residual signal.

Figure 7:
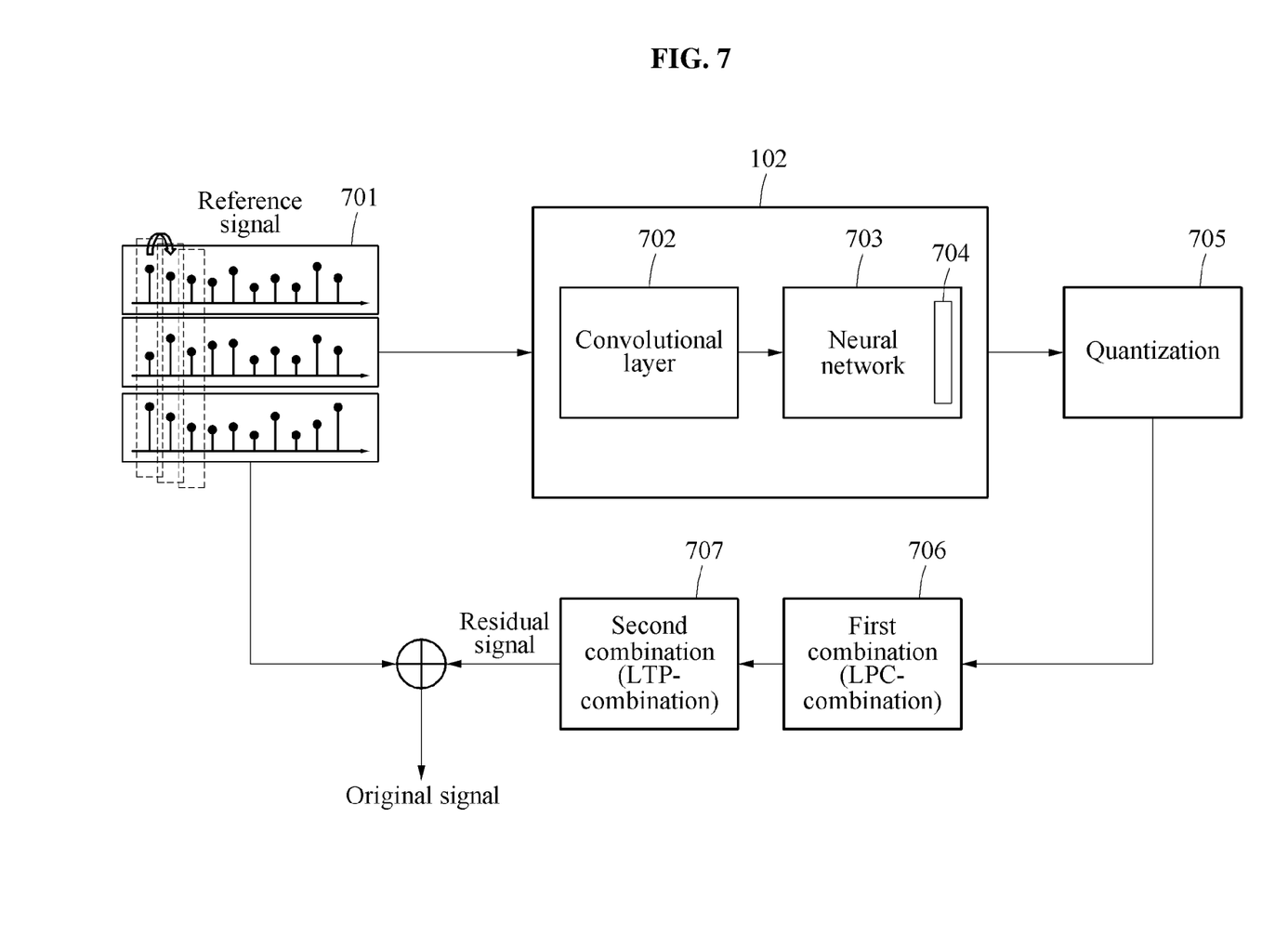
FIG. 7 is a diagram illustrating an audio processing method for performing a decoding process according to an example embodiment.

FIG. 7 is a diagram illustrating an audio processing method for performing a decoding process according to an example embodiment.

In an example of FIG. 7, a first combining process 706 and a second combining process 707 are performed as described in FIG. 6, and the domain conversion 606 and the domain converting process 609 are not performed. The first combining process 706 and the second combining process 707 of FIG. 7 may be processed in a frequency domain. Basic operations of the first combining process 706 and the second combining process 707 may be the same as those of the first combining process 607 and the second combining process 608.

According to example embodiments, it is possible to generate a more accurate residual signal in an audio decoding process by restoring a residual signal having a largest quantity of information in an audio using a neural network to which a convolutional layer is applied.

According to example embodiments, it is possible to output a residual signal by applying a reference signal to a neural network in an audio decoding process, generate an original signal by combining the reference signal and the residual signal, thereby directly generating the residual signal in the audio decoding process without encoding, which may improve an audio coding efficiency.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The method according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method of processing a residual signal for audio coding, the method comprising:
   determining a residual signal of a first band in an original signal of an entire band;
   determining a reference signal of a second band remaining excluding the first band from the original signal of the entire band;
   removing an envelope from the residual signal and the reference signal;
   removing a pitch from the residual signal and the reference signal from which the envelope is removed,
   wherein the residual signal of the first band and the reference signal of the second band are set to be an output and an input of a residual signal learning engine including a convolutional layer and a neural network so as to be trained.

2. The method of claim 1, wherein the reference signal is converted into a feature map including a frame and a frequency bin and set to be an input of the residual signal learning engine.

3. The method of claim 1, wherein the reference signal is convoluted through a filter defined based on a number of bins and a number of frames in the convolutional layer so that a feature is extracted.

4. The method of claim 1, wherein a node of an output layer of the neural network is mapped to an index of a quantization level of the residual signal.

5. A method of processing a residual signal for audio coding, the method comprising:
   restoring a reference signal of a second band other than a first band of an entire band to extract a residual signal of the first band;
   inputting the reference signal of the second band to a residual signal learning engine including a convolutional layer and a neural network;
   extracting the residual signal of the first band from the reference signal through the residual signal learning engine;
   adding an envelope to the residual signal of the first band;
   adding a pitch to the residual signal of the first band; and
   restoring an original signal of the entire band by combining the residual signal to which the envelope and the pitch are added, with the reference signal of the second band.

6. The method of claim 5, wherein the reference signal is converted into a feature map including a frame and a frequency bin and set to be an input of the residual signal learning engine.

7. The method of claim 5, wherein the reference signal is convoluted through a filter defined based on a number of frames and a number of bins in the convolutional layer so that a feature is extracted.

8. The method of claim 5, wherein a node of an output layer of the neural network is mapped to an index of a quantization level of the residual signal.

9. The method of claim 5, wherein an output value of an output layer of the neural network is obtained through one-hot coding.

10. An audio processing apparatus comprising:
    a processor,
    wherein the processor is configured to determine a residual signal of a first band in an original signal of an entire band, determine a reference signal of a second band remaining except for the first band from the original signal of the entire band, remove an envelope from the residual signal and the reference signal, remove a pitch from the residual signal and the reference signal from which the envelope is removed, wherein the residual signal of the first band and the reference signal of the second band are set to be an output and an input of a residual signal learning engine including a convolutional layer and a neural network so as to be trained.

11. The audio processing apparatus of claim 10, wherein the reference signal is converted into a feature map including a frame and a frequency bin and set to be an input of the residual signal learning engine.

12. The audio processing apparatus of claim 10, wherein the reference signal is convoluted through a filter defined based on a number of bins and a number of frames in the convolutional layer so that a feature is extracted.

13. The audio processing apparatus of claim 10, wherein a node of an output layer of the neural network is mapped to an index of a quantization level of the residual signal.

\* \* \* \* \*